United States Patent
Miyahara

(10) Patent No.: US 10,791,270 B2
(45) Date of Patent: Sep. 29, 2020

(54) IMAGE STABILIZATION APPARATUS CAPABLE OF ACCURATELY ESTIMATING AN OFFSET COMPONENT OF AN ANGULAR VELOCITY SENSOR, OPTICAL APPARATUS, AND IMAGE STABILIZATION METHOD

(71) Applicant: CANON KABUSHIKI KAISHA, Tokyo (JP)

(72) Inventor: Shimpei Miyahara, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/270,651

(22) Filed: Feb. 8, 2019

(65) Prior Publication Data
US 2019/0174062 A1    Jun. 6, 2019

Related U.S. Application Data

(63) Continuation of application No. PCT/JP2017/027248, filed on Jul. 27, 2017.

(30) Foreign Application Priority Data

Aug. 12, 2016 (JP) .................... 2016-158340

(51) Int. Cl.
H04N 5/228 (2006.01)
H04N 5/232 (2006.01)
G03B 5/00 (2006.01)

(52) U.S. Cl.
CPC .......... *H04N 5/23261* (2013.01); *G03B 5/00* (2013.01); *H04N 5/2328* (2013.01); *H04N 5/23254* (2013.01); *H04N 5/23258* (2013.01)

(58) Field of Classification Search
CPC ................ H04N 5/23261; H04N 5/23254
See application file for complete search history.

(56) References Cited

U.S. PATENT DOCUMENTS

| 8,289,405 | B2* | 10/2012 | Tsutsumi | ................ G06T 5/003 |
| | | | | 348/208.2 |
| 9,912,869 | B2* | 3/2018 | Miyahara | ........... H04N 5/23258 |
| 9,986,164 | B2* | 5/2018 | Wada | ....................... G03B 5/00 |
| 10,313,593 | B2* | 6/2019 | Miyahara | ........... H04N 5/23287 |

(Continued)

FOREIGN PATENT DOCUMENTS

| JP | 2010-220002 A | 9/2010 |
| JP | 5663897 B | 2/2015 |

(Continued)

*Primary Examiner* — Gary C Vieaux
(74) *Attorney, Agent, or Firm* — Cowan, Liebowitz & Latman, P.C.

(57) ABSTRACT

An image stabilization apparatus includes a processor programmed to function as a first acquirer configured to acquire angular velocity data of an angular velocity sensor, a second acquirer configured to acquire data relating to a position of a correction lens to be driven so as to correct a blur in a captured image, a third acquirer configured to acquire a motion vector calculated based on the captured image, and an estimator configured to estimate an offset component of the angular velocity sensor based on the angular velocity data, the data relating to the position, and the motion vector. The data relating to the position is generated based on the angular velocity data.

10 Claims, 5 Drawing Sheets

(56) References Cited

U.S. PATENT DOCUMENTS

| | | | | |
|---|---|---|---|---|
| 2010/0085436 A1* | 4/2010 | Ohno | ................... | G03B 5/00 |
| | | | | 348/208.1 |
| 2017/0013198 A1* | 1/2017 | Wada | ................... | G06T 5/20 |
| 2017/0134659 A1* | 5/2017 | Miyahara | ........... | H04N 5/23258 |

FOREIGN PATENT DOCUMENTS

| | | |
|---|---|---|
| WO | 2008/117584 A1 | 10/2008 |
| WO | 2015/145858 A1 | 10/2015 |

\* cited by examiner

IMAGE STABILIZATION APPARATUS CAPABLE OF ACCURATELY ESTIMATING AN OFFSET COMPONENT OF AN ANGULAR VELOCITY SENSOR, OPTICAL APPARATUS, AND IMAGE STABILIZATION METHOD

CROSS-REFERENCE TO RELATED APPLICATIONS

This application is a Continuation of International Patent Application No. PCT/JP2017/027248, filed on Jul. 27, 2017, which claims the benefit of Japanese Patent Application No. 2016-158340, filed on Aug. 12, 2016, both of which are hereby incorporated by reference herein in their entirety.

BACKGROUND OF THE INVENTION

Field of the Invention

The present invention relates to an image stabilization apparatus, an optical apparatus, and an image stabilization method.

Description of the Related Art

There has conventionally been known an optical apparatus that includes an image stabilization apparatus (or image blur correction apparatus) configured to correct an image blur. A correction amount is obtained based on a detection result of an angular velocity sensor (gyro sensor) and a motion vector calculated by analyzing a blur between image frames.

Panoramic imaging is also known as a sophisticated imaging method. The panoramic imaging is a technique for generating a vertically or horizontally oriented image with a wide angle of view through continuous capturing by panning the camera and by combining consecutively captured images in the panning direction. An alignment in combining the images generally uses the motion vector, but uses the output from the gyro sensor for a scene when the motion vector cannot be calculated. Then, the output from the gyro sensor, in particular, the integration error caused by the offset noise of the gyro sensor negatively influences the alignment accuracy.

Japanese Patent No. 5663897 discloses an image stabilization apparatus configured to calculate an offset noise of a gyro sensor mounted on a camera side using a motion vector. Japanese Patent Laid-Open No. 2010-220002 discloses an imaging apparatus configured to reset a high-pass filter at a predetermined period so as to prevent electric charges from being saturated in a capacitor serving as the high-pass filter that filters a gyro signal in panoramic imaging.

The image stabilization apparatus disclosed in Japanese Patent No. 5663897 can successfully calculate the offset noise of the gyro sensor unless the image stabilization apparatus is provided to the interchangeable lens, or when the image stabilization apparatus is provided to it but is not driven. However, when the image stabilization apparatus is driven, it is necessary to acquire the position signal of the image stabilization apparatus and the offset noise of the gyro sensor cannot be accurately calculated.

Japanese Patent Laid-Open No. 2010-220002 uses the high-pass filter for the gyro signal and cuts a panning signal in the panning for a longer period than a period of the cutoff frequency of the filter.

With the foregoing problems in mind, it is an object of the present invention to provide an image stabilization apparatus, an optical apparatus, and an image stabilization method, each of which can accurately estimate an offset component of an angular velocity sensor.

SUMMARY OF THE INVENTION

An image stabilization apparatus according to one aspect of the present invention includes a processor programmed to function as a first acquirer configured to acquire angular velocity data of an angular velocity sensor, a second acquirer configured to acquire data relating to a position of a correction lens to be driven so as to correct a blur in a captured image, a third acquirer configured to acquire a motion vector calculated based on the captured image, and an estimator configured to estimate an offset component of the angular velocity sensor based on the angular velocity data, the data relating to the position, and the motion vector. The data relating to the position is generated based on the angular velocity data.

An image stabilization method according to another aspect of the present invention includes a first acquiring step configured to acquire angular velocity data of an angular velocity sensor, a second acquiring step configured to acquire data relating to a position of a correction lens to be driven so as to correct a blur in a captured image, a third acquiring step configured to acquire a motion vector calculated based on the captured image, and an estimating step configured to estimate an offset component of the angular velocity sensor based on the angular velocity data, the data relating to the position, and the motion vector. The data relating to the position is generated based on the angular velocity data.

Further features of the present invention will become apparent from the following description of exemplary embodiments (with reference to the attached drawings).

DESCRIPTION OF THE EMBODIMENTS

Figure 1:
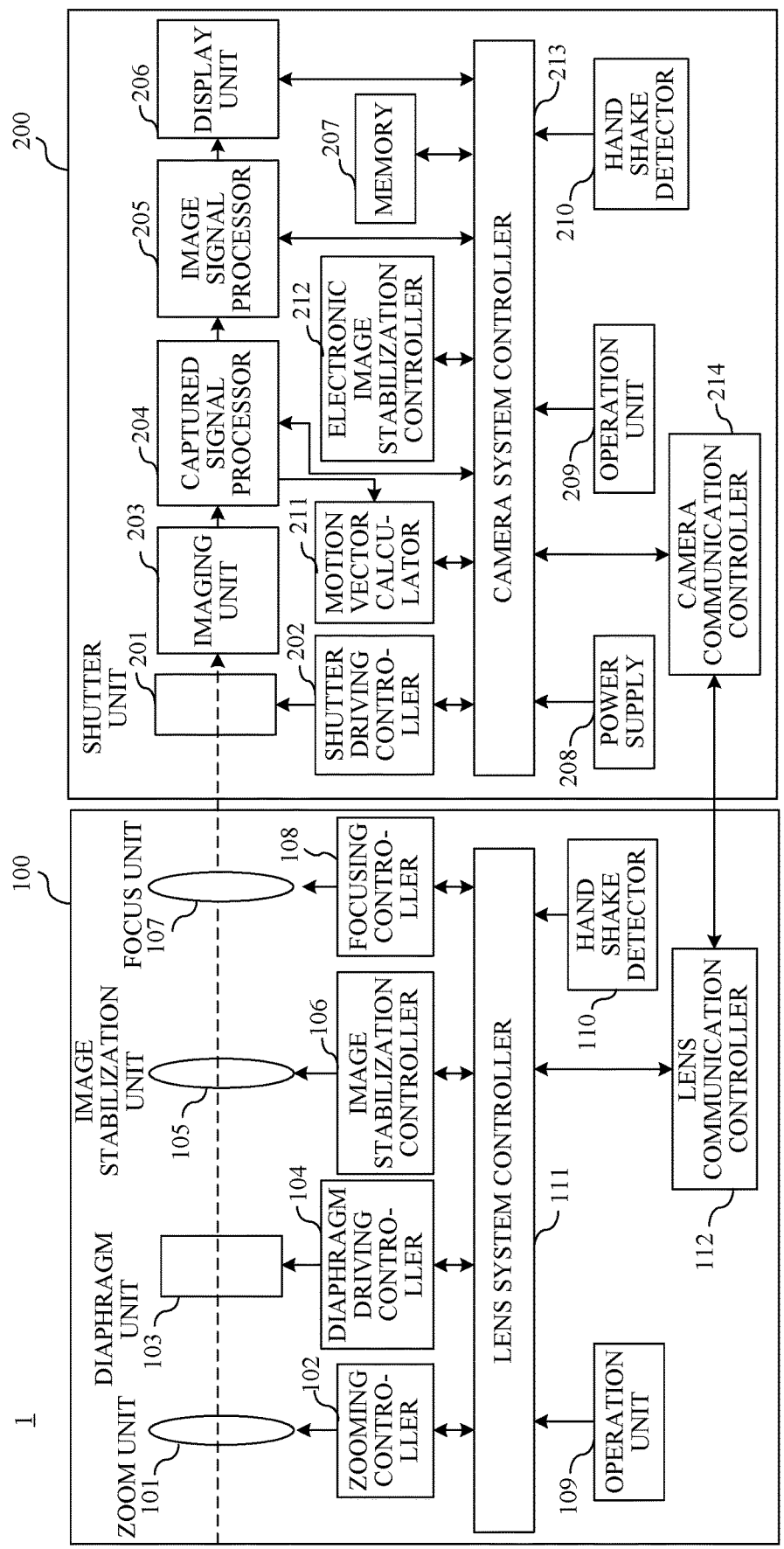
FIG. 1 is a block diagram of an optical apparatus including an image stabilization apparatus according to one embodiment of the present invention.

Referring now to the accompanying drawings, a description will be given of embodiments according to the present invention. In each figure, corresponding elements will be designated by the same reference numerals, and a duplicate description thereof will be omitted.

FIG. 1 is a block diagram of a lens interchangeable type digital camera (referred to as a camera hereinafter) 1 which is an illustrative optical apparatus including an image stabilization apparatus according to one embodiment of the present invention. The camera 1 includes an interchangeable lens 100 and a camera body 200. This embodiment discusses a lens interchangeable type digital camera as an illustrative optical apparatus, but the present invention is not limited to this embodiment. For example, the optical apparatus may be an imaging apparatus in which a lens and a camera body are integrated with each other.

A zoom unit 101 has a zoom lens that performs zooming. A zooming controller 102 controls driving of the zoom unit 101. A diaphragm driving controller 104 controls driving of a diaphragm unit 103. An image stabilization unit 105 includes a correction lens movable to correct an image blur. An image stabilization controller 106 controls driving of the image stabilization unit 105. A focus unit 107 includes a focusing lens. A focusing controller 108 controls driving of the focus unit 107. An operation unit 109 instructs the operation of the interchangeable lens 100. A hand shake detector (camera shake detector) 110 is an angular velocity sensor, such as a gyro sensor, and detects angular velocity data corresponding to a hand shake amount applied to the interchangeable lens 100. The angular velocity data is output as a voltage. A lens system controller 111 controls the entire interchangeable lens 100. A lens communication controller 112 controls a communication with the camera body 200.

A shutter driving controller 202 drives the shutter unit 201. An imaging unit 203 converts an object image formed by the interchangeable lens 100 into an electric signal. A captured signal processor 204 converts the electric signal output from the imaging unit 203 into an image signal (captured image). An image signal processor 205 processes the image signal output from the captured signal processor 204 according to the application. A display unit 206 displays a necessary image based on the signal output from the image signal processor 205. A memory (storage unit) 207 stores various data such as image information. A power supply 208 supplies the power to necessary components according to the application. An operation unit 209 instructs the operation of the camera body 200. A hand shake detector 210 is an angular velocity sensor, such as a gyro sensor, and detects angular velocity data corresponding to a hand shake amount applied to the camera body 200. A motion vector calculator 211 analyzes a blur between frames in the image signal and calculates a motion vector. The motion vector calculator 211 can prevent an erroneous calculation of the motion vector caused by an image noise and remove a blur component other than a hand shake by dividing the image into a plurality of blocks and by calculating the entire motion vector from a plurality of motion vectors calculated for each block. An electronic image stabilization controller 212 controls the electronic image stabilization by cutting out an image. A camera system controller (image stabilization apparatus) 213 controls the entire camera body 200. The camera communication controller 214 controls a communication with the interchangeable lens 100.

A description will now be given of an operation of the camera 1 using the operation units 109 and 209. The operation units 109 and 209 have image stabilization switches that can select an image stabilization mode. When the image stabilization switch is turned on, the lens system controller 111 and the camera system controller 213 instruct the image stabilization operation to the image stabilization controller 106 and the electronic image stabilization controller 212, respectively. The image stabilization controller 106 and the electronic image stabilization controller 212 perform the image stabilization operation until the image stabilization switch is turned off.

The operation unit 209 includes a shutter release button configured so that a first switch SW1 and a second switch SW2 are sequentially turned on in accordance with a press amount. This embodiment turns on the first switch SW1 when the shutter release button is approximately half-pressed, and turns on the second switch SW2 when the shutter release button is fully pressed. When the first switch SW1 is turned on, the focusing controller 108 drives the focus unit 107 for focusing, and the diaphragm driving controller 104 drives the diaphragm unit 103 to set a proper exposure amount. When the second switch SW2 is turned on, a captured image is acquired and stored in the memory 207.

The operation unit 209 includes a motion image recording switch. When the motion image recording switch is turned on, motion image capturing starts, and when the switch is turned on again in the motion image recording, the imaging ends. When the first switch SW1 and the second switch SW2 are turned on in the motion image recording, a still image is captured in the motion image recording.

The operation unit 209 includes a reproduction mode selection switch that can select a reproduction mode. In the reproduction mode, the image stabilization operation stops.

Figure 2:
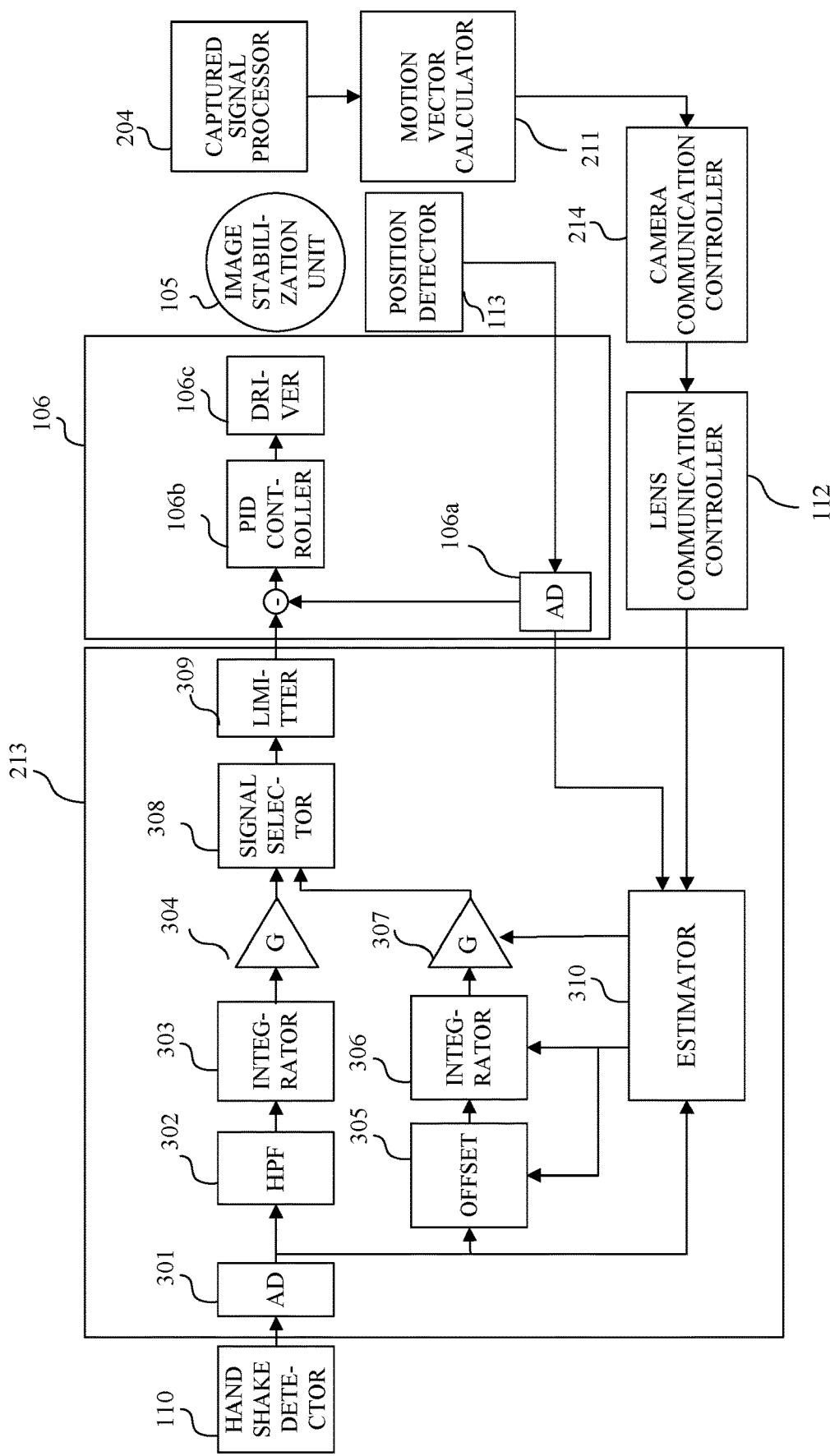
FIG. 2 is a block diagram of a lens system controller.

FIG. 2 is a block diagram of the lens system controller 111. The A/D converter 301 converts the angular velocity data output from the hand shake detector 110 into digital data. A high-pass filter 302 blocks the low-frequency component in the angular velocity data. An integrator 303 integrates the angular velocity data in which the low-frequency component is blocked mainly by the pseudo integration by the low-pass filter and converts it into angle data. A sensitivity multiplier 304 converts the angle data into a shift amount (first image stabilization amount) of the correction lens in the image stabilization unit 105. A value corresponding to the focal length is used for the sensitivity.

An estimator 310 acquires angular velocity data detected by the hand shake detector 110, position data of the correction lens in the image stabilization unit 105, and a motion vector calculated by the motion vector calculator 211. The estimator 310 estimates an offset component, a sensitivity, and each error variance value of the hand shake detector 110 based on the acquired data. An offset unit 305 removes the offset component estimated by the estimator 310 from the angular velocity data output from the hand shake detector 110. The integrator 306 integrates angular velocity data in which the offset component has been removed mainly by the pseudo integration by the low-pass filter and converts it into angle data. A sensitivity multiplier 307 converts the angle data into a shift amount of the correction lens in the image stabilization unit 105 (second image stabilization amount). A value corresponding to the focal length is used for the sensitivity. The shift amount output from the sensitivity multiplier 307 also reflects the correction amount by the sensitivity adjustment of the hand shake detector 110, and absorbs the sensitivity scattering. Using the shift amount output from the sensitivity multiplier 307 can improve the image stabilization performance. The shift amount output from the sensitivity multiplier 307 is calculated based on the angular velocity data in which the low-frequency component is not blocked by the high-pass filter. The image stabilization based on the shift amount output from the sensitivity multiplier 307 can correct an image blur in a frequency component lower than that based on the shift amount output from the sensitivity multiplier 304.

A selector 308 selects one of the shift amounts output from the respective sensitivity multipliers. The selector 308 selects the shift amount output from the sensitivity multiplier 307 in order to increase the image stabilization performance in the still image capturing, and selects the shift amount output from the sensitivity multiplier 304 because this is not the case in the non-still image capturing. A limiter 309 limits the shift amount selected by the selector 308 so that it falls within a movable range of the correction lens in the image stabilization unit 105.

The image stabilization controller 106 includes an A/D converter 106a, a PID controller 106b, and a driver 106c. A position detector 113 detects the position of the correction lens in the image stabilization unit 105 and outputs it as a voltage. The A/D converter 106a converts the data output from the position detector 113 into digital data. The PID controller 106b controls the position of the correction lens in the image stabilization unit 105. The driver 106c converts the shift amount into the voltage and supplies the current to the image stabilization unit 105.

Figure 3:
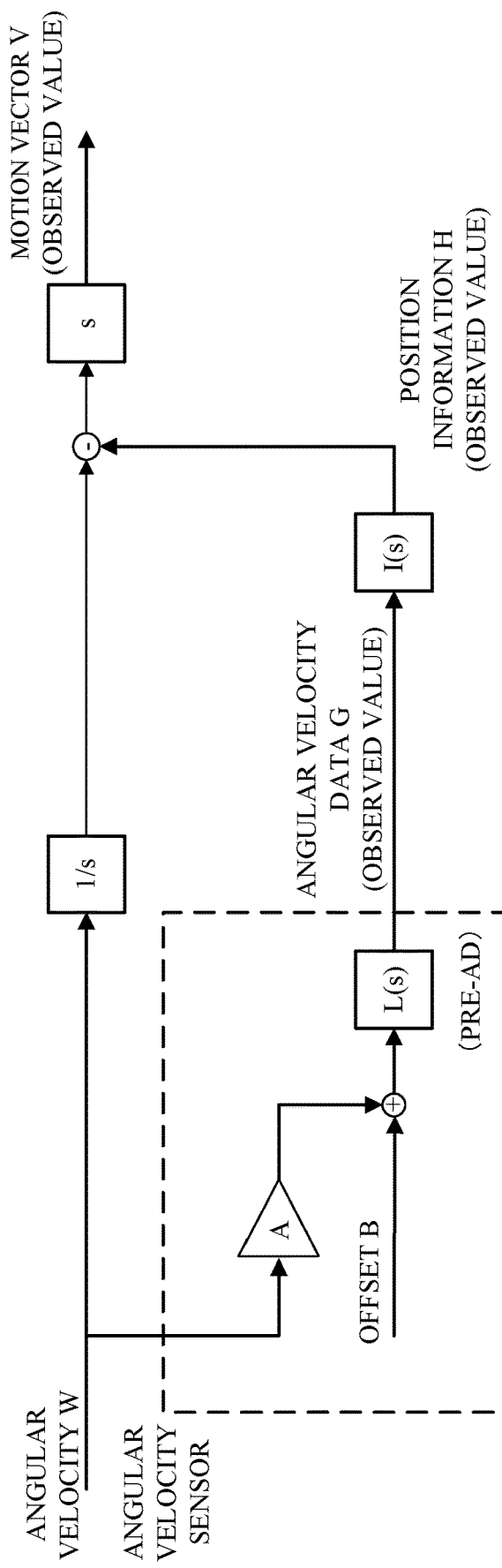
FIG. 3 is an explanatory diagram of an estimated model.

Referring now to FIG. 3, a description will be given of a method for simultaneously estimating the offset component and the sensitivity of the angular velocity sensor based on the angular velocity data, the position data, and the motion vector. FIG. 3 is an explanatory diagram of the estimated model.

When an angular velocity W is applied to the imaging apparatus, the angular velocity sensor mounted on the imaging apparatus initially calculates a signal by multiplying the angular velocity W by the sensitivity A of the angular velocity sensor. Next, it adds an offset component B of the angular velocity sensor having individual scattering to the calculated signal. A high-frequency component in the signal to which the offset component B is added is cut off by the low-pass filter L(s) and detected as angular velocity data G, where s is a complex number in the Laplace transform. The low-pass filter L(s) is provided in the angular velocity sensor in FIG. 3, but may be provided outside the angular velocity sensor. The angular velocity data G is converted into an image stabilization angular velocity by the image stabilization controller I(s) and detected as a position signal (position data) H.

The angular velocity W applied to the imaging apparatus is simply integrated into a true shake angle of the entire imaging apparatus. This signal cannot be detected. The position signal H is subtracted from the shake angle of the entire imaging apparatus and becomes a shake residue angle, and the difference between the frames of the shake angle is detected as the motion vector V.

In FIG. 3, a transfer characteristic from the angular velocity W to the motion vector V is expressed by the following expression (1).

$$V = W - sH \quad (1)$$

In FIG. 3, a transfer characteristic from the angular velocity W to the gyro data G is expressed by the following expression (2).

$$G = L(s)(AW + B) \quad (2)$$

The expression (2) can be expressed by the following expression (3) by removing the angular velocity W that cannot be detected from the expression (1).

$$G = AL(s)(sH + V) + L(s)B \quad (3)$$

Since the frequency band of the hand shake is generally 20 Hz or less and the cutoff frequency of the low-pass filter L(s) is mainly 100 Hz, the expression (3) can be expressed by the following expression (4) since L(s) is approximated to 1.

$$G = A(sH + V) + B \quad (4)$$

While the continuous system has been described, a discrete system will be explained below. In the discrete system, where it is assumed that y(k) is angular velocity data G(k), x(k) is term $\Delta H(k)+V(k)$, and (A(k), B(k)) is an estimation parameter $\theta(k)^T$, the expression (4) is expressed by the following expression (5). Herein, A(k) is the sensitivity of the angular velocity sensor, B(k) is the offset component of the angular velocity sensor, and k is a discrete time.

$$y(k) = G(k), \quad (5)$$
$$x(k) = \Delta H(k) + V(k)$$
$$\theta(k) = \binom{A(k)}{B(k)}$$

A new variable z(k) is expressed by the following expression (6).

$$\begin{cases} \theta(k+1) = \theta(k) + \varepsilon \\ y(k) = \theta(k)^T z(k) + \omega \end{cases} \quad (7)$$

From the expressions (4) to (6), the following state expression (7) is derived.

$$z(k) = \binom{x(k)}{1} \quad (6)$$

Herein, $\varepsilon$ is a system noise parameter representing a fluctuation component of the estimation parameter, and $\omega$ is an observation noise parameter.

From the expression (7), the sensitivity A(k) and the offset component B(k), which are the estimation parameters that can be expressed as the state variables, can be estimated from the angular velocity data G(k), the position signal H(k), and the motion vector V(k). Properly designing the system noise parameter c can estimate the sensitivity A(k) and the offset component B(k) including their temperature variation components.

As described above, if it is assumed that y is the angular velocity data G as the detected value, and x is sH+V as a sum of the position signal H and the motion vector V, the expression (4) becomes a simple linear model as y=Ax+B and can be replaced with a problem of determining a slope A and y-intercept B based on the detection value. The slope A is the sensitivity of the angular velocity sensor, and the y-intercept is the offset component of the angular velocity sensor.

The hand shake detector 210 in the camera body 200 is used for an alignment in the image combination in the camera body 200, for determining the panning of the camera body 200, and the like. The offset error and the sensitivity error become an issue for the hand shake detector 210, similar to the hand shake detector 110. A description will now be given of a method of estimating the offset component and the sensitivity of the hand shake detector 210.

Figure 4:
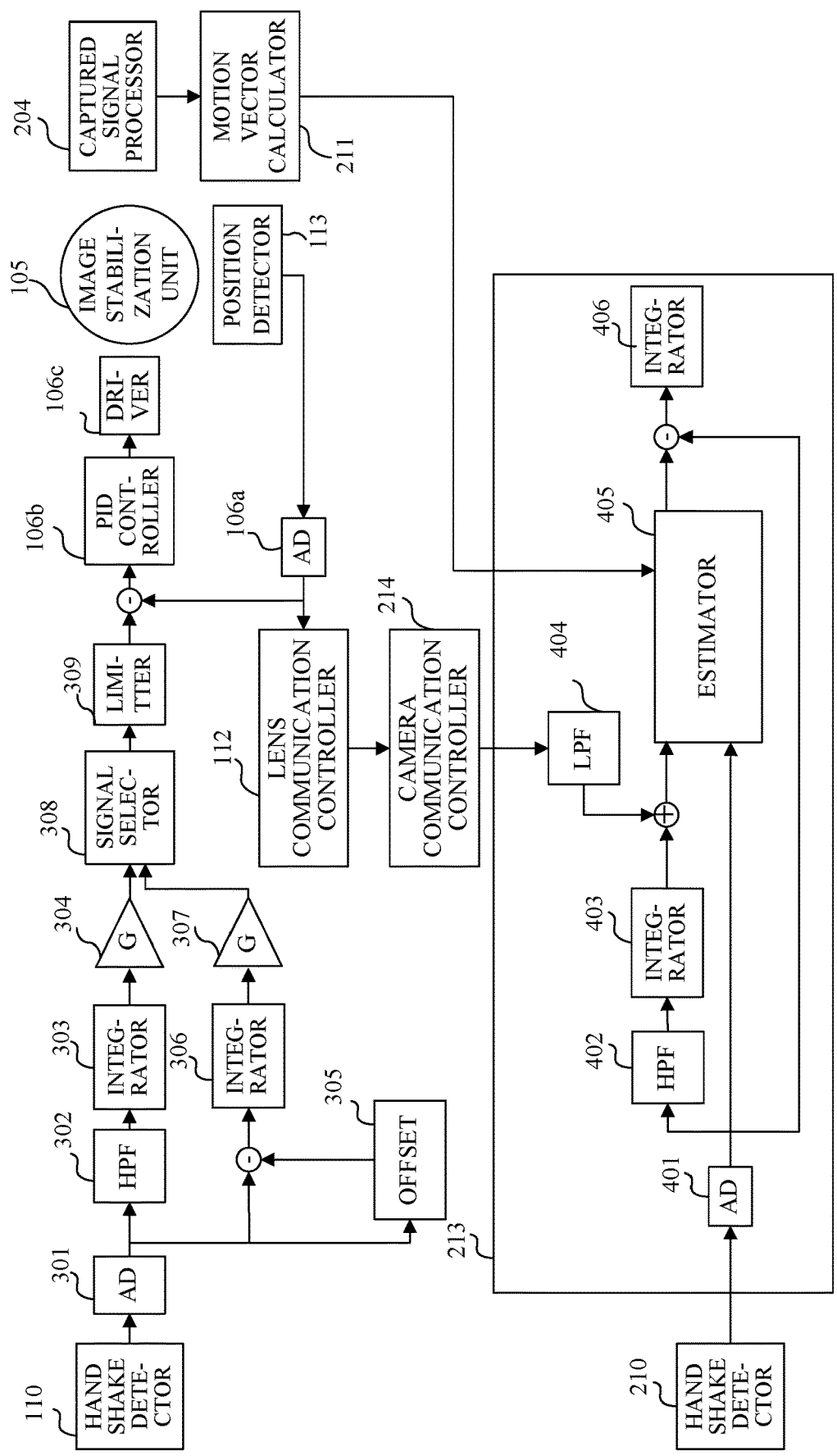
FIG. 4 is a block diagram of a camera system controller.

FIG. 4 is a block diagram of the camera system controller 213. FIG. 4 omits the estimator 310. The estimator 405 estimates the offset component and the sensitivity of the hand shake detector 210 through the above estimation processing based on the angular velocity data, the position data, and the motion vector. Since the position data is detected within the interchangeable lens 100, the detected data is notified to the camera body 200 via the lens communication controller 112 and the camera communication controller 214. Hence, the estimation processing by the estimator 405 is subject to the communication speed. When the position data cannot be received at a high rate due to the influence of other communications, the low-frequency position data can be detected but the high-frequency position data cannot be detected. Accordingly, this embodiment generates the high-frequency position data in a pseudo manner using the hand shake detector 210, combines the generated position data and the actually detected low-frequency position data, and generates pseudo position data of the correction lens in the image stabilization unit 105.

An A/D converter 401 converts the angular velocity data output from the hand shake detector 210 into digital data. A high-pass filter 402 blocks a low-frequency component in the angular velocity data. An integrator 403 converts the angular velocity data from which the low-frequency component has been removed into a pseudo shift amount (pseudo image stabilization amount). A low-pass filter 404 blocks the high-frequency component in the position data. Combining the output of the integrator 403 and the output of the low-pass filter 404 generates the position data of the correction lens in the image stabilization unit 105 in a pseudo manner. An integrator 406 integrates the angular velocity data from which an accurately estimated offset component is removed, and converts it into an angle signal. The angle signal represents a moving angle of the camera body 200, and is used for the panning determination of the camera body 200, for the alignment in the image combination, and the like.

Figure 5:
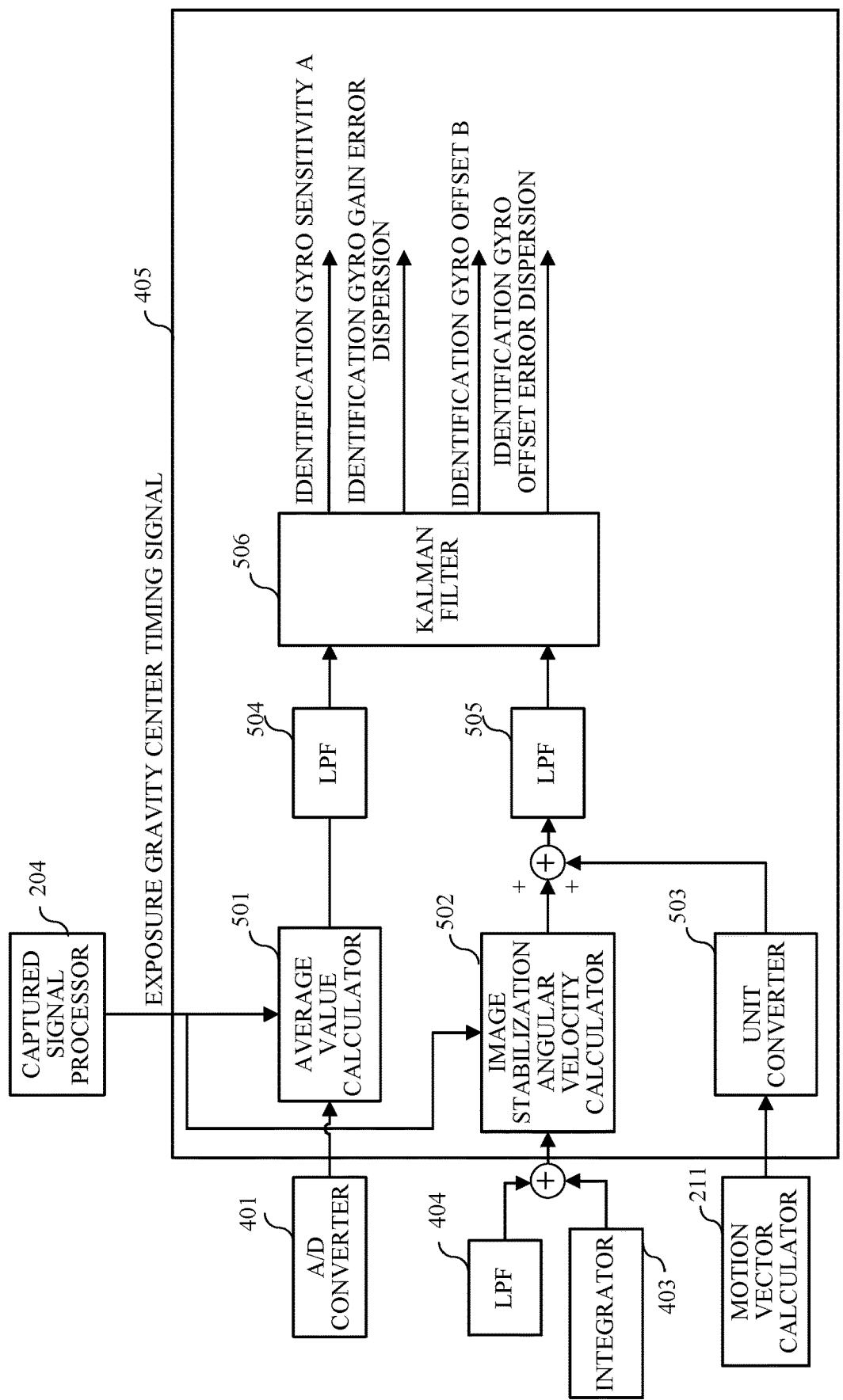
FIG. 5 is a block diagram of an estimator.

Referring now to FIG. 5, a description will be given of an internal configuration of the estimator 405. FIG. 5 is a block diagram of the estimator 405. The estimator 405 includes an average value calculator (first acquirer) 501, an image stabilization angular velocity calculator (second acquirer) 502, a unit converter (third acquirer) 503, low-pass filters 504 and 505, and a Kalman filter (estimator) 506.

The estimation processing in the estimator 405 is sampled at 30 Hz or 60 Hz which is the slowest sampling motion vector among the detected data. The angular velocity data and the position data are sampled at several kHz in each A/D converter, but using an exposure gravity center timing signal output from the captured signal processor 204 can make a synchronization with the motion vector.

The average value calculator 501 acquires the angular velocity data from the A/D converter 401 and calculates an interframe average value between exposure gravity centers of the angular velocity data. The image stabilization angular velocity calculator 502 obtains the pseudo position data of the correction lens in the image stabilization unit 105 from the integrator 403 and the low-pass filter 404, and calculates the interframe image stabilization angular velocity from the difference between the exposure gravity centers in the position data. The unit converter 503 acquires a motion vector from the motion vector calculator 211 and converts a unit of the motion vector into an angular velocity. The data output from the average value calculator 501 is input to the low-pass filter 504, and the data that is the sum of the data output from the image stabilization angular velocity calculator 502 and the data output from the unit converter 503 is input to the low-pass filter 505. Therefore, aliasing can be reduced. The data output from the low-pass filters 504 and 505 are input to the Kalman filter 506. The Kalman filter 506 estimates the offset component and the sensitivity of the hand shake detector 210. It also calculates an estimated error variance value indicating the reliability of the estimation result.

A description will now be given of filtering for estimating the estimation parameter θ using the Kalman filter 506.

Initially, a Kalman gain is calculated using the following expression (8).

$$K(k) = \frac{P(k) \cdot z(k)}{\sigma_\omega^2 + z^T \cdot P(k-1) \cdot z(k)} \quad (8)$$

Next, the estimated parameter θ is calculated using the following expression (9).

$$\theta(k) = \theta(k-1) + K(k)\{y(k) - z^T(k) \cdot \theta(k-1)\} \quad (9)$$

Finally, the estimated error variance value is calculated using the following expression (10).

$$P(k) = P(k-1) - \frac{P(k-1) \cdot z(k) \cdot z^T(k) \cdot P(k-1)}{\sigma_\omega^2 + z^T \cdot P(k-1) \cdot z(k)} + R_\varepsilon \quad (10)$$

Herein, k is a discrete time (number of filtering steps), K is a Kalman gain (1×2 matrix) and P is an estimated error covariance matrix (2×2 matrix). In addition, $\sigma_\omega$ is angular velocity data observation noise variance (scalar quantity), and $R_\varepsilon$ is a system parameter (2×2 matrix) considering the temperature variation of the estimation parameter θ. An initial value of the estimated error covariance matrix P may be set to a predetermined value. Setting an excessively large value may diverge the estimation result, and thus it becomes a parameter that needs to be tuned according to the observed noise.

The angular velocity data observation noise variance $\sigma_\omega$ may use an observation-noise actual measurement value of the angular velocity data but as shown in the expressions (8) and (10), the larger it is the more slowly the estimation converges and the smaller it is the faster the estimation converges. On the other hand, the larger it is the more stable the filter is, the smaller it is the more likely the estimation result diverges. Hence, it may be considered as a tuning parameter for determining the convergence speed of the filter.

The estimated error variance value is an index that indicates how much the estimation parameter θ(j) at a predetermined time j varies from k=0 to j, and is a value equivalent to the reliability of the estimation parameter θ at the time j.

This embodiment estimates the estimation parameter θ using the Kalman filter, but the present invention is not limited to this embodiment. For example, the estimation parameter θ may be estimated using the sequential least-squares method. However, the sequential least squares method does not consider the observation noise or the system noise (estimation parameter variation component) and the filtering robustness is low. Therefore, it cannot handle with the temperature variation of the parameter, and the estimated value converges to a certain value. It is thus desirable to use the Kalman filter in the actual design.

This embodiment combines the high-frequency position data generated in a pseudo manner using the hand shake detector 210 and the actually detected low-frequency position data, and generates the pseudo position data of the correction lens in the image stabilization unit 105. When the communication speed is sufficiently high (acquisition sampling of the position data is faster than the generation speed of the motion vector), it is unnecessary to use the pseudo high-frequency position data (the output signal from the integrator 403). As the communication speed becomes lower than the generation speed of the motion vector, the cutoff frequencies of the high-pass filter 402 and the low-pass filter 404 may be decreased and the ratio of the output signal from the integrator 403 to the position data may be increased. In some cases, the output signal from the integrator 403 may be used as position data.

In a signal band of about 5 Hz to 10 Hz, which is a main band of the hand shake, the position data generated in a pseudo manner based on the angular velocity data output from the hand shake detector 210 is approximately equal to position data output from the interchangeable lens 100. However, on the lower frequency side, when the camera body 200 is panning, a control for preventing an edge contact of the image stabilization unit 105 is peculiar to the interchangeable lens 100 and it is difficult to reproduce the actually detected position data. According to this embodiment, the camera system controller 213 serves as a determiner configured to determine the panning of the camera body 200 based on the output signal from the hand shake detector 210 or the motion vector calculator 211, and thereby to determine whether the estimation processing of the estimator 405 is to be updated. More specifically, when the signal output from the hand shake detector 210 or the motion vector calculator 211 is greater than the predetermined value and is output for a period longer than the predetermined period, the camera system controller 213 determines that the camera body 200 is panning. Meanwhile, the camera system controller 213 stops updating the Kalman filter 506 or does not cause the estimator 405 to update the estimation processing. On the other hand, if the camera system controller 213 determines that the camera body 200 is not panning, the camera system controller 213 causes the estimator 405 to update the estimation processing. Thereby, the offset component of the hand shake detector 210 can be estimated only with a highly accurate model signal (x(k) in the expression (5)) and the estimation accuracy can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention can provide an image stabilization apparatus, an optical apparatus, and an image stabilization method, each of which can accurately estimate an offset component of an angular velocity sensor.

What is claimed is:

1. An image stabilization apparatus comprising
an angular velocity sensor configured to acquire angular velocity data; and
a processor programmed to function as:
a first acquirer configured to acquire data relating to a position of a correction lens to be driven so as to correct a blur in a captured image;
a second acquirer configured to acquire a motion vector calculated based on the captured image;
an estimator configured to estimate an offset component of the angular velocity sensor based on the angular velocity data, the data relating to the position, and the motion vector;
a low-pass filter configured to cut off a high-frequency component from position data of the correction lens based on a detection result of a position detector configured to detect the position of the correction lens; and
a high-pass filter configured to cut off a low-frequency component from data based on the angular velocity data,
wherein the first acquirer acquires the data relating to the position based on an output signal from the low-pass filter and an output signal from the high-pass filter.

2. The image stabilization apparatus according to claim 1, wherein the first acquirer acquires sets cutoff frequencies of the high-pass filter and the low-pass filter based on acquisition sampling of the data relating to the position.

3. The image stabilization apparatus according to claim 1, wherein the first acquirer generates the data relating to the position without position data of the correction lens based on a detection result of a position detector configured to detect the position of the correction lens.

4. The image stabilization apparatus according to claim 1, wherein the processor further functions as a determiner configured to determine whether the imaging apparatus is panning, based on the angular velocity data and the motion vector,
wherein when the determiner determines that the imaging apparatus is panning, the estimator does not update estimating processing, and when the determiner determines that the imaging apparatus is not panning, the estimator updates the estimating processing.

5. An optical apparatus including the image stabilization apparatus according to claim 1.

6. The imaging apparatus according to claim 1 further comprising
a communication unit configured to communicate with the lens apparatus,
wherein the second acquirer
acquires position data of the correction lens from the lens apparatus, and
generates data relating to the position based on the angular velocity data and the position data of the correction lens acquired by the communication unit.

7. The imaging apparatus according to claim 6, wherein the processor further functions as:
a low-pass filter configured to cut off a high-frequency component from position data of the correction lens obtained from the communication unit, and
a high-pass filter configured to cut off a low-frequency component from data based on the angular velocity data,
wherein the data relating to the position is generated based on an output signal from the low-pass filter and an output signal from the high-pass filter.

8. The imaging apparatus according to claim 7, wherein cutoff frequencies of the high-pass filter and the low-pass filter are set based on acquisition sampling of the data relating to the position.

9. An image stabilization method comprising:
an angular velocity acquiring step configured to acquire angular velocity data of an angular velocity sensor;
a capturing step configured to capture an object image formed by a lens apparatus and obtain a captured image;
a first acquiring step configured to acquire data relating to a position of a correction lens of the lens apparatus to be driven so as to correct a blur in the captured image;
a second acquiring step configured to acquire a motion vector calculated based on the captured image; and
an estimating step configured to estimate an offset component of the angular velocity sensor based on the angular velocity data, the data relating to the position, and the motion vector,
wherein the first acquiring step acquires the data relating to the position based on the angular velocity data acquired by the angular velocity sensor.

10. An imaging apparatus to which a lens apparatus including a correction lens is detachably attached, the imaging apparatus comprising:
- an angular velocity sensor configured to acquire angular velocity data;
- an imaging sensor configured to capture an object image formed by the lens apparatus and obtain a captured image; and
- a processor programmed to function as:
- a first acquirer configured to acquire data relating to a position of the correction lens to be driven so as to correct a blur in the captured image;
- a second acquirer configured to acquire a motion vector calculated based on the captured image; and
- an estimator configured to estimate an offset component of the angular velocity sensor based on the angular velocity data, the data relating to the position, and the motion vector,
- wherein the first acquirer acquires the data relating to the position based on the angular velocity data acquired by the angular velocity sensor.

* * * * *